United States Patent [19]

Bagdasarjanz et al.

[11] 3,868,576

[45] Feb. 25, 1975

[54] DEVICE FOR AUTOMATIC EQUALIZATION

[76] Inventors: Felix Bagdasarjanz, Winterthur; Peter Eugen Leuthold, Erlenbach, both of Switzerland

[22] Filed: Dec. 21, 1972

[21] Appl. No.: 317,167

[30] Foreign Application Priority Data

Dec. 30, 1971 Netherlands ....................... 7118088

[52] U.S. Cl. ........................ 325/65, 325/42, 333/18, 333/28

[51] Int. Cl. ............................................ H04b 3/04

[58] Field of Search ............ 325/41, 42, 65; 333/18, 333/28

[56] References Cited

UNITED STATES PATENTS

| | | | |
|---|---|---|---|
| 3,660,761 | 5/1972 | Harmon et al. | 325/65 |
| 3,670,269 | 6/1972 | Starr et al. | 325/65 |

*Primary Examiner*—Robert L. Griffin
*Assistant Examiner*—Marc E. Bookbinder
*Attorney, Agent, or Firm*—Frank R. Trifari
Simon L. Cohen

[57] ABSTRACT

A device for automatic equalization equipped with a large number of parallel equalizing networks having a fixed but mutually different transmission characteristics, the correct equalizing network being selected by means of an eye pattern analyzer.

6 Claims, 8 Drawing Figures

DEVICE FOR AUTOMATIC EQUALIZATION

Figure 1:
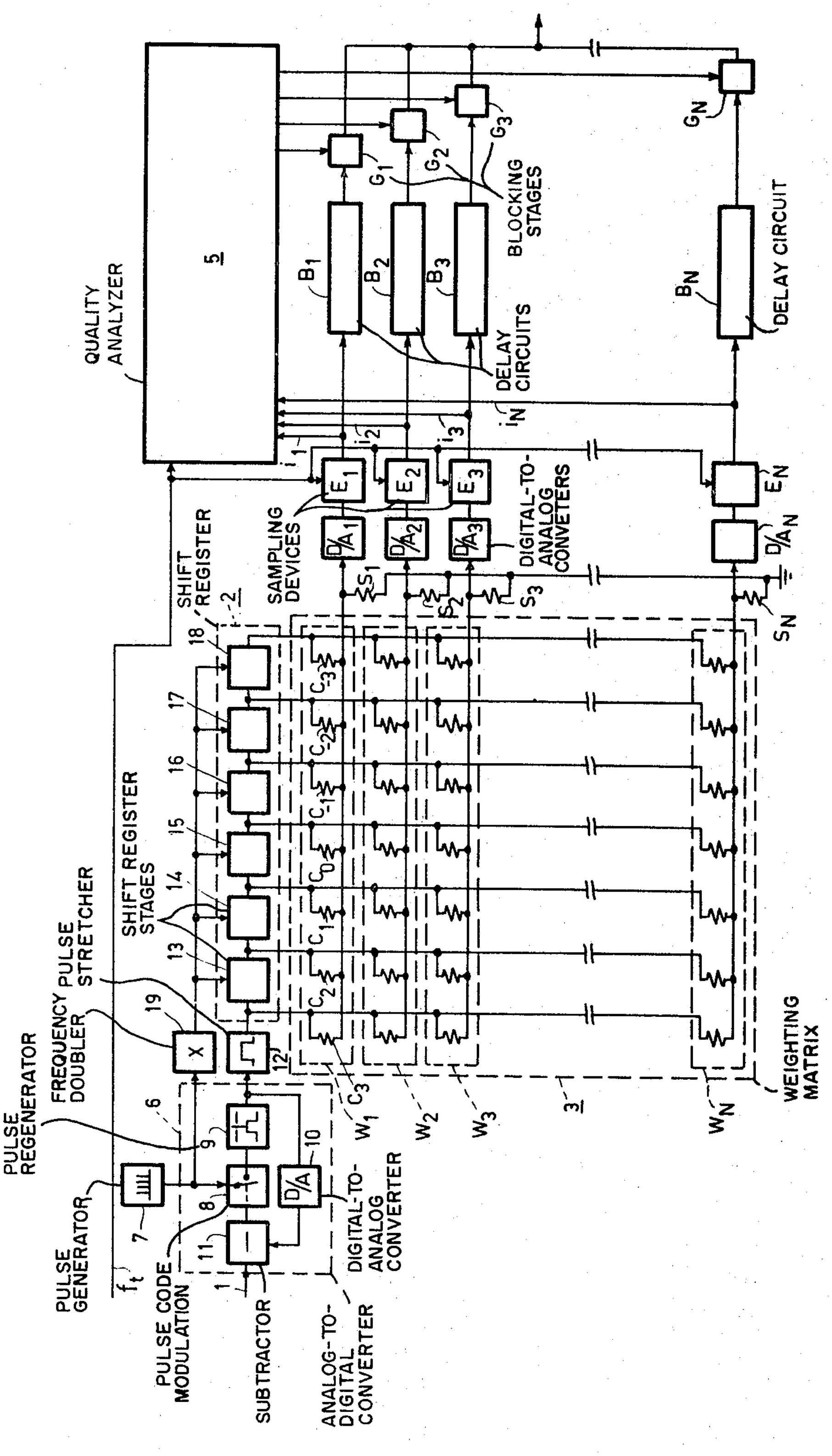

The invention relates to a device for automatic equalization of the transmission characteristic formed by the amplitude-versus-frequency and phase-versus-frequency characteristics of a transmission band associated with a transmission path for the transmission of synchronous information signals.

Depending on the nature and character of the transmission path automatic equalizing devices may be classified in accordance with two main types, namely automatic equalizing devices of the preset type for transmission paths whose transmission characteristics remain substantially constant during signal transmission, for example, fixed connections where prior to signal transmission the automatic equalizing device is adjusted with the aid of a transmitted test signal, and automatic equalizing devices of the continuously variable or adaptive type for transmission paths whose transmission characteristic may vary during signal transmission, for example, switched connections where the setting is continually corrected during signal transmission.

Such automatic equalizing devices are essentially based on the same principle. In particular such an automatic equalizing device is equipped with an adjustable equalizing network, the shape of the output signal of which, viewed in a time diagram, is referred to an adjusting criterion in a reference circuit in order to produce a control signal which is applied to a control device for controlling the adjustable equalizing network. As is common practice, the adjustable equalizing network is constituted by a network operating in the time domain, having the form of a delay circuit provided with a number of branches including adjustable attenuating networks which are controlled by the control device, the output signal from the automatic equalizing device, which in the reference circuit is referred to the adjusting criterion in order to produce said control signal, being obtained by combination of the output signals of the branches.

In the automatic equalizing devices of the preset type the adjusting criterion is a fixed reference signal which is given since the different levels of the undistorted transmitted test signal at the receiver end are known. This adjusting criterion is considerably more complicated in the case of automatic equalizing devices of the continuously variable or adaptive type in which, for example, the shape of the eye pattern of the equalized signals, the proper instants of polarity transitions in the equalized pulses etc. are employed as adjusting criteria.

In both types of automatic equalizing devices the desired adjustment is obtained in steps or interatively. Specifically after establishing the deviation of the output signal of the automatic equalizing device relative to the adjusting criterion, a setting of the adjustable attentuation networks in the branches of the delay circuit is changed by the control device, which process is repeated until the required adjusting criterion is met. Although in practice satisfactory results have been achieved with said devices, one nevertheless encounters problems under certain circumstances. For example, these known devices require a relatively long adjustment time or adaptation time due to the iterative adjusting process, so that information is lost when switching on the connections and also when compensating for rapid variations of the transmission characteristics of the transmission path, as occur, for example, in the event of fast fading phenomena in radio communications. Moreover, it has been found that with transmission paths of poor quality and thus strong signal distortion, the adjustment of the desired equalisation characteristic is not achieved, which consequently implies that the known automatic equalizing devices are unstable at very strong distortions.

The object of the invention is to provide an automatic equalizing device of the type as mentioned in the preamble whose adjusting or adaptation time is reduced to substantially zero so that no information is lost and which device is moreover stable, even at very strong distortions.

According to the invention such an automatic equalizing device for this purpose comprises a number of parallel equalizing networks formed by a shift register to whose input the received signals are applied and a matrix network connected to taps of the shift register and consisting of weighting elements which are proportioned so as to define per matrix line a specific, but for each matrix line a different transmitted characteristic, the outputs of said matrix lines being coupled on the one hand to separate blocking stages and, on the other hand, in parallel to a quality analyzer adapted to evaluate the quality of the equalized signals present at the outputs of each of the matrix lines, said analyzer being connected via parallel output circuits to said blocking stages, supplies a control signal for unblocking those blocking stages at which an equalized signal of satisfactory quality occur.

Figure 2A:
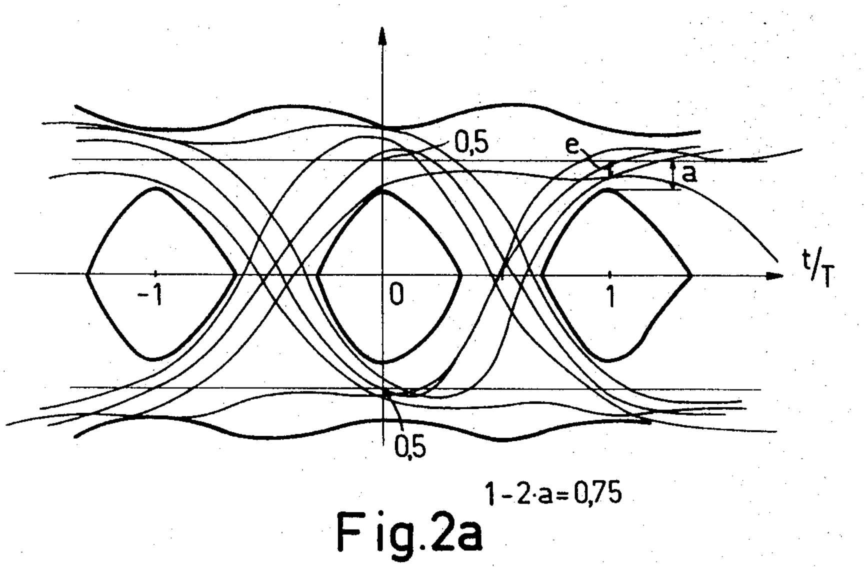
Figure 2B:
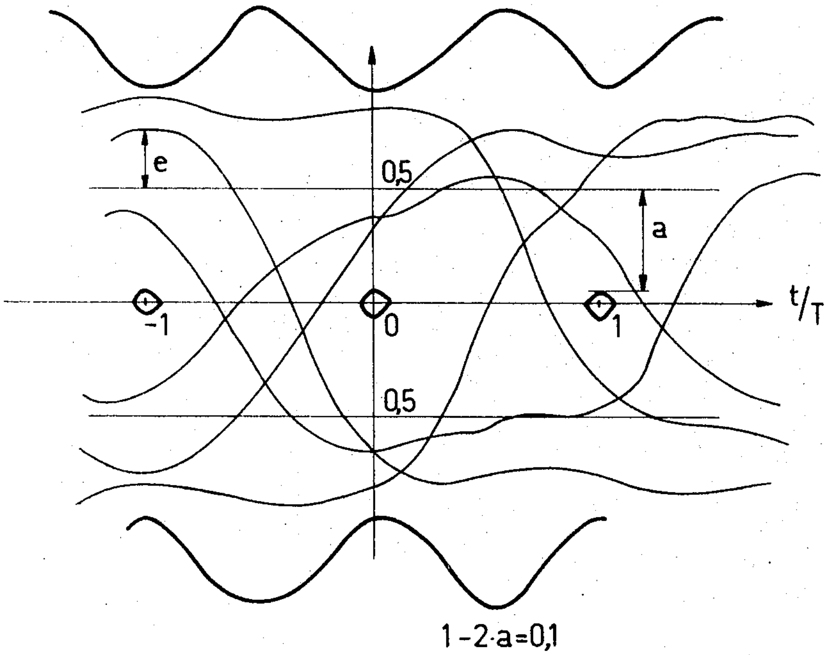
Figure 3:
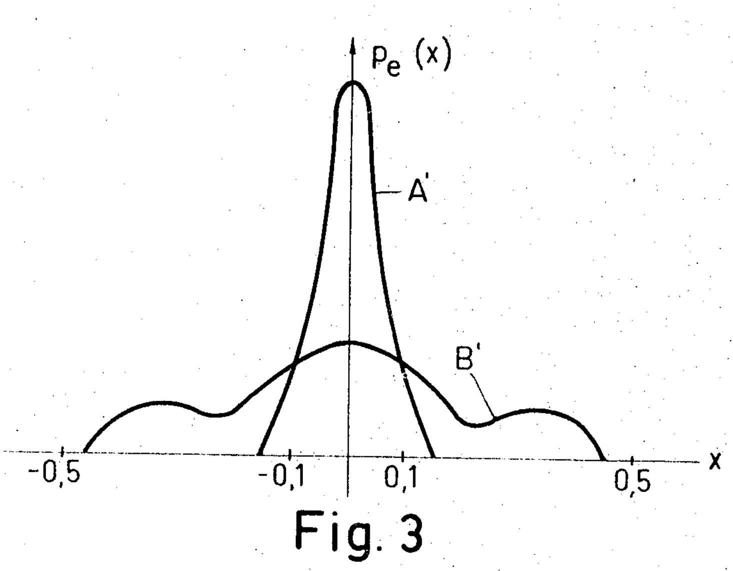
Figure 4:
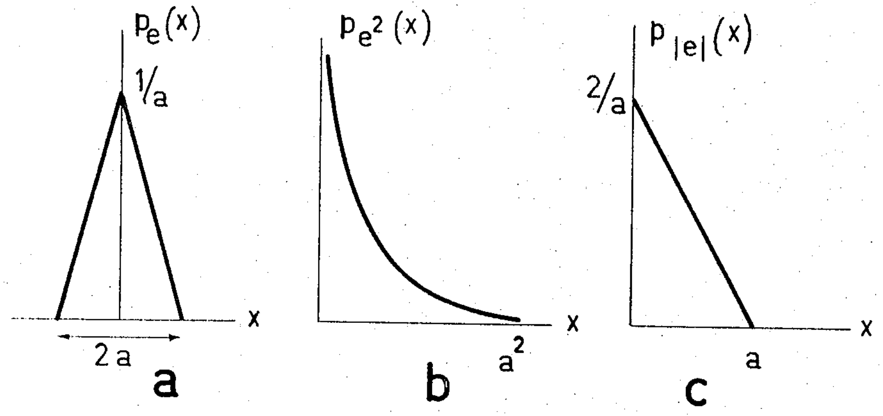
Figure 7:
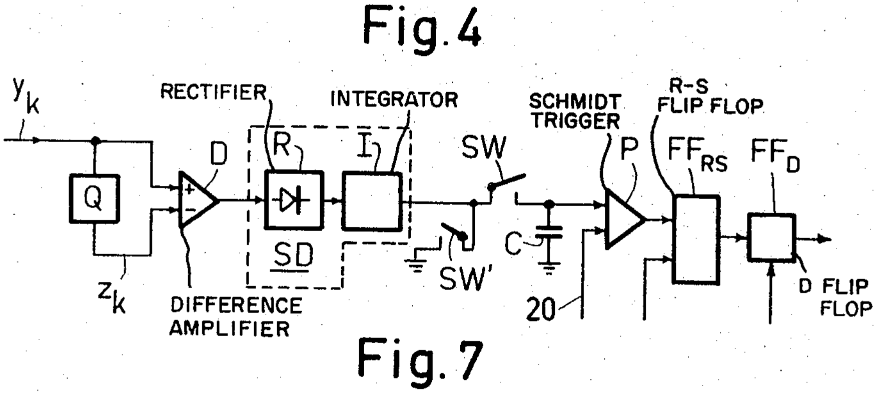
Figure 5:
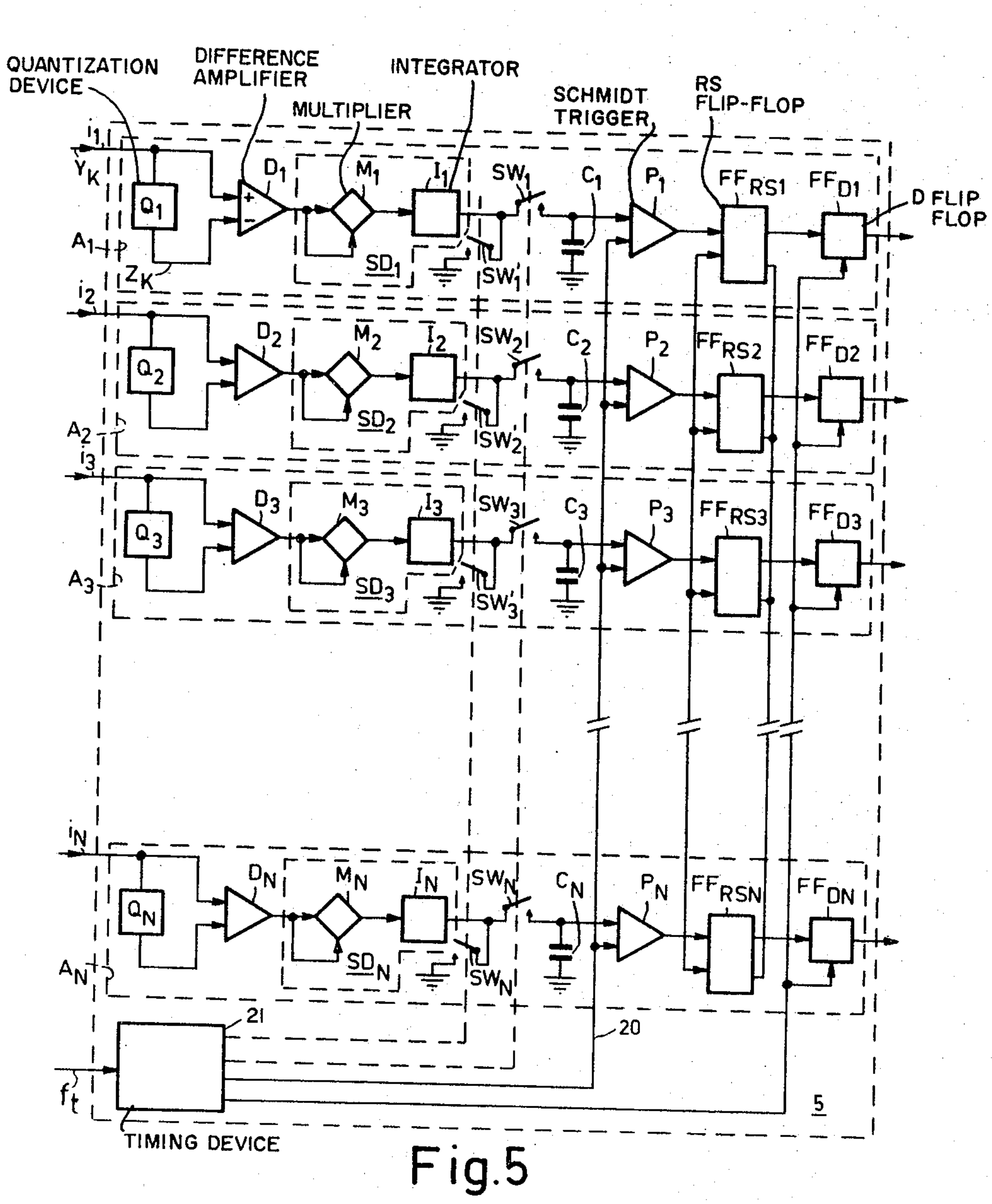
Figure 6:
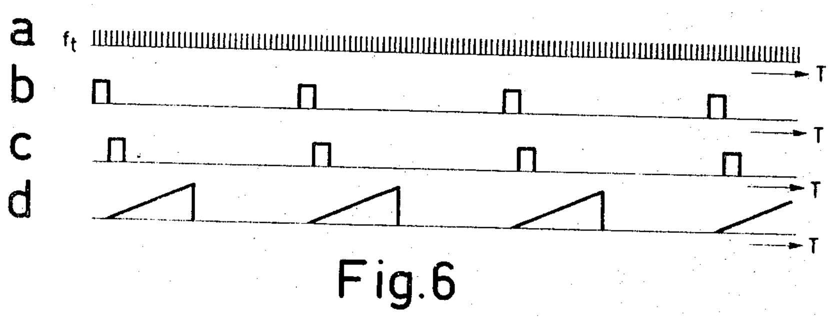

The invention and its advantages are described in detail with reference to the Figures of which FIG. 1 shows a possible embodiment of an automatic equalizing device according to the invention, FIGS. 2*a* and 2*b* show two eye patterns for illustration purposes, FIG. 3 shows the probability density function $P_e(x)$ corresponding to these eye patterns, FIG. 4 shows standard density functions, FIG. 5 shows a possible embodiment of the quality analyzer as used for the device according to FIG. 1, FIG. 6 shows some time diagrams to explain the quality analyzer of FIG. 5, and FIG. 7 shows an alternative embodiment of the channels in the quality analyzer according to FIG. 5.

Reference numeral 1 in FIG. 1 represents a transmission path whose transmission characteristic, as formed by the amplitude-versus-frequency characteristic and the phase-versus-frequency characteristic, may vary arbitrarily within certain limits. To achieve automatic equalization of this transmission characteristic the analog signals received via said transmission path 1 are applied to an automatic equalizing device according to the invention comprising a number of parallel equalizing networks which are formed by a single shift register 2 and a matrix network 3 connected to taps of the shift register and consisting of weighting elements which are proportioned so as to define per matrix line a specific, but for each matrix line a different transmission characteristic. The outputs of the matrix lines are coupled to separate blocking stages $G_1$, $G_2$, $G_3$ . . . $G_n$ in parallel to a quality analyzer 5 for evaluating the quality of the equalized signals applied thereto and which analyzer via parallel outputs circuits connected to the said blocking stages $G_1$, $G_2$, $G_3$ . . . $G_n$ supplies a control signal which opens those blocking stages at which an equalized signal of satisfactory quality occurs.

In the embodiment of FIG. 1 a digital shift register 2 is employed and the equalization process acts upon the pulse-shaped output signals of an analog-to-digital converter 6 to which the transmitted analog signals are applied. The code used for digital-to-analog conversion does not affect the equalization process.

In the device according to FIG. 1 the analog-to-digital converter 6 is a delta modulator which is formed by a pulse code modulator 8 connected to a pulse generator 7, the output pulses of the pulse code modulator being applied via a pulse regenerator 9 to a digital-to-analog converter 10 constituted by an integrating network. The output signal of the integrating network 10, as well as the incoming analog signal are applied to a subtractor 11 to produce a difference signal which controls the pulse code modulator 8.

In the analog-to-digital converter 6 formed by the delta modulator the pulse generator 7 applies pulses to the pulse code modulator 8 at a pulse repetition frequency which is a multiple of the highest frequency in the frequency band covered by the analog signal. Depending on whether the instantaneous value of the output signal of the integrating network 10 is smaller or greater than the analog signal which is also applied to difference producer 11, a difference signal of negative or positive polarity will occur at the output of difference producer 11. Depending on this polarity of the difference signal the pulses from pulse generator 7 will be or will not be present at the output of pulse code modulator 8. These pulses are applied to the digital-to-analog converter 10 via pulse regenerator 9 which eliminates any variations in amplitude, duration or shape caused in the pulse code modulator 8.

The delta modulator described above tends to render the difference signal zero so that the output signal of integrating network 10 represents a quantized approximation of the analog signal.

For, with a difference signal of negative polarity the pulse code modulator 8 feeds a pulse to the integrating network 10, so that the negative difference signal is counteracted, whereas with a difference signal of positive polarity the pulse code modulator 8 does not apply a pulse to the integrating network 10 thus opposing the continued presence of the positive difference signal. The delta modulator 6 thus forms a pulse train in which the presence and absence of the pulses characterize the incoming analog signal. This pulse train is applied via a pulse stretcher 12 to said shift register 2 which contains six groups 13, 14, 15, 16, 17 and 18 of eight shift register elements each, which in order to simplify the Figure are not shown individually and whose contents are shifted with a shift period $\tau$ by means of shift pulses. The shift pulses in the present embodiment are derived from a frequency doubler 19 which is connected to the same pulse generator 7 which supplies the pulses for the delta modulator 6.

The matrix network 3 used in conjunction with said shift register 2 comprises a great number of weighting elements arranged in lines and columns. These elements in the embodiment shown consist of resistors which per matrix line together form weighting networks W1, W2, W3 . . . WN, respectively, via which the groups of shift register elements 13, 14, 15, 16, 17 and 18, respectively, are connected to corresponding combination networks $S_1$, $S_2$, $S_3$ . . . $S_N$, respectively, in order to combine the pulse trains which are shifted over a time interval 8 $\tau$.

The pulse trains thus obtained after combination are converted into an equal number of analog signals by means of the digital-to-analog converters $D/A_1$, $D/A_2$, $D/A_3$ . . . $D/A_N$, respectively, connected to the combination networks $S_1$, $S_2$, $S_3$ . . . $S_N$, respectively. The weighting networks $W_1$, $W_2$, $W_3$ . . . $W_N$, each define a specific, but mutually different, transmission characteristic. These specific, mutually different transmission characteristics are selected in accordance with the distortions actually occurring in telephony channels under varying practical condition and in accordance with the relevant data transmission system. Any of these desired transmission characteristics can be obtained by suitably proportioning the respective transmission coefficients $C_{-3}$, $C_{-2}$, $C_{-1}$, $C_0$, $C_1$, $C_2$, $C_3$ of the weighting elements of the weighting networks $W_1$, $W_2$, $W_3$ . . . $W_4$, respectively, during a certain shift period. Per definition it is true that when using a shift register having 2N + 1 shift register elements both a certain amplitude-versus-frequency characteristic and a phase-versus-frequency characteristic can be obtained by a proper selection of the values of the weighting elements. The shift register 1 and the weighting networks $W_1$, $W_2$, $W_3$ . . . $W_N$ with associated combination networks thus together constitute a number of parallel equalizing networks having fixed, mutually different transmission characteristics, corresponding to the number of weighting networks. According, a transmitted analog signal, which is applied to shift register 2 via the digital-to-analog converter 6, will result in the occurrence at the respective outputs of the digital-to-analog converters $D/A_1$, $D/A_2$, $D/A_3$ . . . $D/A_N$, of a number of equalized signals of mutually different quality, depending on the degree of correction exercised by the individual equalizing networks. Via the sampling devices $E^1$, E , $E^3$ . . . E connected to the outputs of the digital-to-analog converters $D/A_1$ , $D/A_2$, $D/A_3$ . . . $D/A_N$ respectively, these equalized signals are applied to the blocking devices $G_1$, $G_2$, $G_3$ . . . $G_N$, which are coupled to these sampling devices, and via the lines $i_1$, $i_2$, $i_3$ . . . $i_N$ to said quality analyzer 5, which on the basis of certain criteria to be explained hereinafter sorts out the equalized signal of the highest quality and opens the blocking device to which this signal is applied. The sampling pulses $f_t$, as shown in FIG. 6*a*, supplied to the quality analyzer 5, and to the sampling devices $E_1$, $E_2$ . . . $E_n$, are provided by a pulse generator (not shown) that is similar to pulse generator 7 of the analog-to-digital converter 6.

Since the transmitted signal as such is unknown at the receiver end, the quality of each of the equalized signals cannot readily be determined for lack of such a fixed reference. However, the levels which the transmitted signal may have are known at the receiver end. For example, for a trivalent signal three fixed levels are possible.

By applying the equalized signal to, for example, a quantization device operating with quantizing increments equal to the mutual difference in level of two consecutive fixed levels, it is possible to estimate in a simple manner which of said fixed levels per bit interval is suited as a reference. Assuming that the magnitude of each quantizing increment is 1, the lowest of said fixed levels will be selected as a reference when the nominal value of the signal applied to the quantization device exceeds this lowest or zero level, but does not differ more than half a quantizing increment from the next fixed level. Any of the other fixed levels is selected depending on whether the nominal value of the signal applied to the quantization device lies within a half quantizing increment from the relevant fixed level. When the nominal value of the equalized signal applied to the quantization device is denominated $y$ and the reference level selected per bit interval $z$, comparison of the nominal value $y$ with the selected reference level $z$ can yield an error signal $e$ which lies in the range $-\frac{1}{2}<e<\frac{1}{2}$.

For each one of the equalized signals applied to quality analyzer 5 it is correct to say that the associated error signal $e$ an individual statistical regularity, which expressed in the "error probability density function $P_e(x)$" may serve as a measure of the quality of the relevant equalized signal.

Said density function can be derived from the eye pattern which is known as a criterion for evaluating the quality of data transmitted systems. Such an eye pattern is obtained by dividing the output signal (for example, for a pseudo-random pulse train) into segments having a duration of twice the bit length and by reproducing all these segments in one and the same two-bit interval. The inner contour of the eye pattern thus obtained is called the eye opening. To characterize the density function use is made of the maximum height of the eye opening. The greatest maximum height of the eye opening is obtained when the transmission system satisfies Nyquist's first criterion.

This is illustrated in FIGS. 2*a* and 2*b* which show two eye patterns belonging to different bivalent signals of mutually different quality.

Assuming that the greatest maximum height of the eye opening is 1 and the deviation from this is $2a$, the eye pattern shown in FIG. 2*a* has an eye opening equal to $1 - 2a = 0.75$ and the eye pattern shown in FIG. 2*b* has an eye opening equal to $1 - 2a = 0.1$. The value $a$, as shown in FIGS. 2 and 2*b*, is characteristic of a certain quality of the eye pattern.

The quality of the eye pattern is, moreover, characterized by a certain distribution of the error signal $e$. This distribution obeys a certain rule according to which the probability density function $p_e(x)$ multiplied by the error voltage range $dx$ indicates the probability $P_e(x)$ that the error signal value $e$ at any sampling instant lies within the range $(x, x + dx)$.

The density functions $P_e(x)$ corresponding to the eye patterns shown in FIGS. 2*a* and 2*b* are represented for the purpose of explanation in FIG. 3 by the curves A' and B' respectively. Normalization with the value $a$ as a parameter, with $a$ being in the range $0 \leq a \leq \frac{1}{2}$ yields the normalized density function:

$$p_e(x) - (1/a)\ (1 - [\,|x|\,/a])$$

shown in FIG. 4*a*, in which $z$ lies the range $-a \leq x < +a$. FIG. 4*b* shows the correspondingly derived density function:

$$p_e^2(x) = (1/a\ \sqrt{x})\ (1 - \ \sqrt{x}/a);\ 0 \leq x \leq a^2$$

of the arbitrary variable $e^2$;

and FIG. 4*c* shows the correspondingly derived density function:

$$p|e|\,(x) = (2/a)\ (1 - [x/a])\ ;\ 0 \leq x \leq a$$

of the arbitrary variable $|e|$.

Since, as has been explained above, the eye patterns of different quality are characterized by different probability density functions $p_e(x)$ of the error signal $e$, it is possible to obtain an indication of the quality of each of the equalized signals by determining for each of the equalized signals the average value of the associated error signal $e$ for a limited number of sample values.

It follows that selection of the equalized signal having the best quality can be effected according to three different criteria:

a. By determining the "variation" $\sigma_e^2$ over a limited number of K sample values for each of the equalized signals and by selection of the equalized signal for which:

$$m_2 = \delta_e^2 = \sum_{k=1}^{K} e_k^2 = \text{minimum}.$$

b. By determining the average value of the error signal $|e|$ of a limited number of $K$ sample values for each of the equalized signals and selection of the equalized signal for which:

$$m_1 = \sum_{k=1}^{K} |e| = \text{minimum}$$

c. By determining the maximum deviation of the error signal $e$ relative to the average value 0, occurring in a certain observation time for each of the equalized signald and by selection of the equalized signal for which:

$$e_{max} = \text{Max}\ |e_k| = \text{minimum},\ k = 1, 2, 3 \ldots K$$

FIG. 5 shows an embodiment of the quality analyzer 5 which is based on the criterion mentioned under (a). In this embodiment the quality analyzer 5 comprises a separate channel for each of the equalized signals applied thereto via lines $i_1, i_2, i_3 \ldots i_N$. These separate channels are identical and in the Figure they are designated $A_1, A_2, A_3 \ldots A_N$, respectively. These channels successively comprise a quantization device $Q_1, Q_2, Q_3 \ldots Q_N$, respectively, a difference amplifier $D_1, D_2, D_3 \ldots D_N$, respectively, a statistic detection device $SD_1, SD_2, SD_3 \ldots SD_N$ formed by cascading a multiplier stage $M_1, M_2, M_3 \ldots M_N$ and an integrator $I_1, I_2, I_3 \ldots I_N$; two switches $S_W$, $S_W'$, $S_W$, $S_W'$, $S_W$, $S_W'$, $S_W$, $S_W'$, respectively, a memory formed by a capacitor $C_1, C_2, C_3 \ldots C_N$, an amplifier connected as a Schmitt trigger $P_1, P_2, P_3 \ldots P_N$, respectively, an RS flip flop $FF_{RS1}$, $FF_{RS2}$, $FF_{RS3} \ldots FF_{RSN}$, respectively, and an output formed by a D-flipflop $FF_{D1}, FF_{D2}, FF_{D3} \ldots FF_{DN}$. In addition the quality analyzer 5 includes a timing device 21 common to all channels and supplying the output signals shown in FIG. 6.

The operation of the described quality analyzer is as follows:

The equalized signals $y_k$ fed to the respective channels $A_1, A_2, A_3 \ldots A_N$ via input lines $i_1, i_2, i_3 \ldots i_N$ at discrete instants $k$T (see FIG. 6*a*) are quantized in each of the various channels forming part of quantization devices $Q_1, Q_2, Q_3 \ldots Q_N$, respectively, in order to produce reference signals $z_K$ which per channel correspond to the instantaneous estimated value of the transmission level. In the respective difference amplifiers $D_1, D_2, D_3 \ldots D_N$ these reference signals $z_K$ are subsequently compared with the applied equalized signals $y_K$ so as to obtain the error signal values $e_k = y_k - z_k$.

The error signal values $e_k$ which per sample are thus obtained in the respective channels, are squared in the respective multiplier stages $M_1, M_2, M_3 \ldots M_N$, and fed to the respective integrators $I_1, I_2, I_3 \ldots I_N$ which are simultaneously read out once per $K$ sample periods. For this purpose the switches $SW_1$, $SW_2$, $SW_3$ . . . $SW_N$, respectively, which are connected to the outputs of the integrators are all momentarily closed at the same time by the control signal shown in FIG. 6*b*. This control signal is derived from timing device 21 and occurs once per K sample periods. The moment these switches are closed, the sum of the values of $e_K^2$ occurring over K sample periods in the respective integrators $I_1$, $I_2$, $I_3$ . . . $I_N$ is read out and stored in the respective memories formed by capacitors $C_1$, $C_2$, $C_3$ . . . $C_N$. Immediately after each read-out interval all the integrators are briefly shortcircuited by the control signal shown in FIG. 6*c*. This control signal is derived from timing device 21 and momentarily closes all the switches $SW'_1$, $SW'_2$, $SW'_3$ . . . $SW'_N$ connected to the outputs of the integrators simultaneously. After this operation the values of $e_k^2$ occurring in the next K sample periods can be added.

Thus, after each period of duration KT the respective memories contain the sum of the square of the error signal $e_k$ over $k$ sample periods, this sum value $$\sum_{k=1}^{K} e_k^2$$

being smaller as the quality of the equalized input signal improves. Hence, after each period of duration KT it is possible to determine which of the equalized input signals yields the smallest sum value $$\sum_{k=1}^{K} e_k^2.$$

For this purpose the sum values $$\sum_{k=1}^{K} e_k^2$$

stored in the respective memories $C_1$, $C_2$, $C_3$ . . . $C_N$ are compared in the amplifiers $P_1$, $P_2$, $P_3$ . . . $P_N$ respectively with the sawtooth-shaped voltage shown in FIG. 6*d*. This sawtooth voltage is derived from timing device 19 and fed to these amplifiers via line 20. As soon as the instantaneous value of this sawtooth-shaped voltage exceeds the smallest of the sum values $$\sum_{k=1}^{K} e_k^2$$

applied to the respective amplifiers P, the relevant amplifier constituted by a Schmitt trigger circuit changes over to its other stable state and this change of state is registered by the RS-flipflop $FF_{RS}$ connected to the amplifier, while moreover the outputs of the other amplifiers P are blocked. The output signal of the RS-flipflop registering the above-mentioned change of state indicates which equalized signal has the best quality. This output signal is subsequently applied, to the D-flipflop connected to it, so as to unblock the relevant blocking device G in FIG. 1 at which this equalized signal of the best quality occurs.

The use of the measures according to the invention yields the important advantage that the device is fully stable, so that loss of information is avoided, because a suitable equalizing network is available for any normal variation of the transmission characteristic. In particular the described device can be further perfected by storing the transmitted information in buffer stores which are coupled to the outputs of the respective equalizing network, the statistics of the transmitted information signals being analyzed as described previously in order to arrive at the selection of stored information of the best quality. This novel conception in which the transmitted information is stored during the time when selection takes place, has the appreciable advantage that even in the case where the equalization during the signal transmission is to be corrected continually no loss of transmitted information occurs. Moreover, the adaptation time, i.e. the time required to make the proper choice, is very short.

Specifically, the above-mentioned adaptation time is equal to the time KT required by the quality analyzer to form the sum signals $$\sum_{k=1}^{K} e_k^2 \text{ or } \sum_{k=1}^{K} e_k$$

and to select the best equalized signal on the basis of these sum signals.

The use of, for example, the central limit theorem enables the statistics of the values as defined in the criteria mentioned previously under (a) and (b) to be evaluated.

When calculating the number of sample values $K$ of the error signal $e$ required in order to be able to correctly discriminate between two eye patterns characterized by, for example, the values $a_1 = 0.05$ and $a_2 = 0.1$ at a specified degree of probability WSH = 0.999, this calculation reveals that the said requirement is met when the number of sample values is chosen to be $k \geq 35$.

If used in a transmission system whose sample frequency is 8 *kc*, this means that the time required for forming the sum signals is approximately 5 msecs. and the total adaptation time is only approximately 7 msecs.

Due to this extremely short adaptation time it is now possible in the case of so-called fixed connections, where the transmitter and receiver are synchronized in a time interval preceding the transmission of information by a synchronizing signal transmitted during this synchronizing time interval, to carry out the selection of the correct equalization during this synchronizing time interval and on the basis of the synchronizing signal quality, thus ensuring correct equalization prior to the transmission of information and avoiding loss of information without the use of buffer stores.

When selection of the correct equalization also takes place during the transmission of information, as occurs both with fixed and switched connections, the loss of information is simply avoided due to the fact that, as FIG. 1 shows, a buffer store in the form of a delay circuit $B_1$, $B_2$, $B_3$ . . . $B_N$ whose delay time equals the adaptation time is included in each of the connections between the output of the digital-to-analog converter $D/A_1$, $D/A_2$, $D/A_3$ . . . $D/A_N$, respectively, and blocking device $G_1$, $G_2$, $G_3$ . . . $G_N$.

An alternative embodiment of the quality analyzer 5, which is based on the criterion mentioned previously under (b) is obtained if the respective channels $A_1$, $A_2$, $A_3$ . . . $A_N$ in FIG. 5 are arranged as shown in FIG. 7.

As this Figure shows this embodiment only differs from that of FIG. 5 in that the statistic detection devices $SD_1$, $SD_2$, $SD_3$ . . . $SD_N$ each are formed by cascading a rectifier stage R, which converts the error signal values $e_k$ appearing at the output of the difference amplifier D into their absolute values $|e_k|$, and an integrator I. After integration over K sample periods the sum signal $$\sum_{k=1}^{K} e_k^2.$$

thus obtained is further processed in the same way as in FIG. 5 except that in this case the equalized signal is selected for which:

$$\sum_{k=1}^{K} |e_k| = \text{minimum}.$$

With respect to this embodiment it may be observed that with the same decision accuracy the number of sample values K of the error signal $|e_k|$ required hardly differs from the number required for the embodiment shown in FIG. 5.

Another alternative embodiment which is based on the criterion mentioned previously under (c)

$e_{max.}$ = Max. $|e_k|$ = minimum is obtained when the statistical detector $SD_1$, $SD_2$, $SD_3$ . . . $SD_N$ respectively provided in each of the channels of the previously described embodiments of the quality analyzer is formed by cascading a rectifier stage R, which converts the error signal value $e_k$ applied to it into its absolute value $|e_k|$, and a peak detector (not shown) which determines the maximum deviation of $|e|$ relative to the average value thereof occurring in an observation period of a certain duration. Such an embodiment is susceptible to interference pulses, because no integration is applied. On the one hand this may give rise to incorrect decisions, but on the other hand this embodiment ensures that always the equalizing network is selected which provides the most effective damping of the interference pulses.

In this respect it is to be noted that instead of the delta modulator 6 employed in the embodiment of FIG. 1, it is alternatively possible to use a pulse code modulator as analog-to-digital converter, a number of parallel shift registers corresponding to the number of code bits being connected in columns to the weighting elements of the matrix network via a combination device. The weighting elements need not necessarily consist of resistors (as shown) but may alternatively be formed by amplifiers with different gain factors or by different current sources.

Finally it is to be noted that instead of a digital shift register it is alternatively possible to employ an analog shift register formed by means of capacitors in which case analog-to-digital conversion can be omitted.

What is claimed is:

1. A device for automatic equalization of the transmission characteristic formed by the amplitude-versus-frequency and the phase-versus-frequency characteristic of a transmission band associated with a transmission path for the transmission of synchronous information signals, characterized in that said device comprises analog-to-digital conversion means for converting received analog signals to digital form, a plurality of parallel equalizing networks comprising a shift register to whose input said digital signals are applied and a matrix network connected to taps of the shift register and comprising weighting elements which have values defining for each equalizing network a different transmission characteristic thereby producing a plurality of different equalized signals, said device further comprising circuit means connected to the outputs of each equalizing network, a plurality of blocking stages each associated with one of said plurality of equalizing networks and coupled to said equalizing network through said circuit means, signal quality analyzing means connected to said circuit means for evaluating the quality of each of said plurality of equalized signals, said analyzer being further connected to said blocking stages and supplying a control signal to unblock one of said stages so that an equalized signal of satisfactory quality appears at the output thereof.

2. A device as claimed in claim 1, wherein said circuit means further comprises a buffer store whose delay time is equal to the time required by the quality analyzer to analyze the equalized signals applied to it.

3. A device as claimed in claim 1, characterized in that the signal quality analyzer comprises a plurality of mutually identical channels corresponding to the number of equalized signals, means for applying the equalized signals successively to the channels of the quality analyzer, quantization means in each channel responsive to the instantaneous value $y_k$ of the equalized signal applied thereto for supplying reference signal $z_k$ corresponding to the estimated level of the transmitted signal, a separate difference amplifier in each channel, means for connecting the relevant equalized signal and said reference signal from the quantizing means in the same channel thereby providing an error signal value $e_k = (y_k - z_k)$, a statistic detection device to which said error signal values are applied and of which the output voltage value varies with the quality of the input signal, means for periodically sampling the output of said statistic detection device, a store connected to said sampling means for the temporary storage of the sampled output, and a trigger circuit means having an output circuit connected to the associated blocking device for opening this blocking device to the exclusion of the other blocking devices when a common sawtooth-shaped voltage applied to the trigger circuit exceeds the voltage value applied from the store to the relevant trigger circuit.

4. A device as claimed in claim 3, characterized in that the statistic detection device provided in each of the channels of the quality analyzer comprises a multiplier means for squaring the error signal value $e_k$ applied to it, an integrator connected in cascade with the multiplier, the squared signal values $|e^2_k|$ from the multiplier being applied to the integrator, further means for sampling the integrator once per K sample periods, the voltage value $$\sum_{k=1}^{K} e_k^2.$$

from said further sampling means being temporarily stored in said store.

5. A device as claimed in claim 3, characterized in that the statistic detection device provided in each of the channels of the quality analyzer comprises a rectifier stage for converting the error signal value $e_k$ applied to it into its absolute value $|e_k|$, and an integrator cascaded with the rectifier stage, the absolute values $|e_k|$ from the rectifier being applied to the integrator, further means for sampling the integrator once per $K$ sample values, the voltage value $$\sum_{k=1}^{K} |e_k|$$

from said further sampling means bing temporarily stored in said store.

6. A device as claimed in claim 3, characterized in that the statistic detection device provided in each of the channels of the quality analyzer comprises a rectifier stage for converting the error signal value $e_k$ applied to it into its absolute value $|e_k|$, a peak detector connected in cascade with the rectifier stage for determining the maximum deviation of $|e|$ relative to the average value thereof occurring in an observation period of specific duration, and means for temporarily storing said maximum value of $|e_k|$ in said store.

* * * * *

UNITED STATES PATENT AND TRADEMARK OFFICE

CERTIFICATE OF CORRECTION

Page 1

PATENT NO. : 3,868,576

DATED : February 25, 1975

INVENTOR(S) : FELIX BAGDASARJANZ and PETER EUGEN LEUTHOLD

It is certified that error appears in the above-identified patent and that said Letters Patent are hereby corrected as shown below:

ON THE TITLE PAGE

Insert the following where appropriate:

--[73] Assignee: U.S. Philips Corporation, New York, N.Y.--;

IN THE SPECIFICATION

Col. 4, line 35, "$E^1$, E ,$E^3$.....E" should be --$E_1$, $E_2$, $E_3$,...$E_N$--;

Col. 5, line 54, "z" should be --x--;

Col. 6, lines 42 and 43 should read --.$I_N$; two switches $S_{W1}$, $S'_{W_1}$, $S_{W2}$, $S'_{W2}$, $S_{W3}$, $S'_{W3}$, $S_{WN}$, $S'_{WN}$, respectively, a memory formed by a capacitor $C_1$,--;

UNITED STATES PATENT OFFICE

CERTIFICATE OF CORRECTION

Patent No. 3,868,576 Dated February 25, 1975

Inventor(s) Felix Bagdasarjanz et al.

It is certified that error appears in the above-identified patent and that said Letters Patent are hereby corrected as shown below:

Col. 7, line 8, "$e_K^2$" should be -- $e_k2$ --.

Claim 4, line 10, in the equation cancel the period.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,868,576

DATED : February 25, 1975

INVENTOR(S) : FELIX BAGDASARJANZ and PETER EUGEN LEUTHOLD

It is certified that error appears in the above-identified patent and that said Letters Patent are hereby corrected as shown below:

IN THE SPECIFICATION

Col. 4, line 23, "1" should be --2--;

line 28, "According" should be --Accordingly--;

Col. 5, line 38, "Figs. 2" should be --Figs. 2a--;

Col. 6, line 27, "signald" should be --signals--;

IN THE CLAIMS

Claim 3, line 8, after "supplying" insert --a--; after "$z_k$" insert -- , --(a comma);

line 9, cancel in its entirety;

line 10, cancel "signal,"; after "channel" cancel the comma (,);

line 11, cancel "means".

Signed and Sealed this

*sixth* Day of *January 1976*

[SEAL]

*Attest:*

RUTH C. MASON
*Attesting Officer*

C. MARSHALL DANN
*Commissioner of Patents and Trademarks*